(12) United States Patent
Avadhanam et al.

(10) Patent No.: US 9,118,932 B2
(45) Date of Patent: Aug. 25, 2015

(54) ADAPTIVE FILTERING MECHANISM TO REMOVE ENCODING ARTIFACTS IN VIDEO DATA

(71) Applicant: NVIDIA Corporation, Santa Clara, CA (US)

(72) Inventors: Niranjan Avadhanam, Karnataka (IN); Ravi Kumar Boddeti, Andhra Pradesh (IN)

(73) Assignee: NVIDIA Corporation, Santa Clara, CA (US)

( * ) Notice: Subject to any disclaimer, the term of this patent is extended or adjusted under 35 U.S.C. 154(b) by 224 days.

(21) Appl. No.: 13/917,669

(22) Filed: Jun. 14, 2013

(65) Prior Publication Data
US 2014/0369613 A1 Dec. 18, 2014

(51) Int. Cl.
| | |
|---|---|
| *H04N 19/86* | (2014.01) |
| *H04N 19/176* | (2014.01) |
| *H04N 19/172* | (2014.01) |
| *H04N 19/117* | (2014.01) |
| *H04N 19/14* | (2014.01) |

(52) U.S. Cl.
CPC ............. *H04N 19/86* (2014.11); *H04N 19/117* (2014.11); *H04N 19/14* (2014.11); *H04N 19/172* (2014.11); *H04N 19/176* (2014.11)

(58) Field of Classification Search
USPC .......... 382/261, 268, 275; 348/607, 614, 620, 348/701; 375/240.29
See application file for complete search history.

(56) References Cited

U.S. PATENT DOCUMENTS

| | | | |
|---|---|---|---|
| 5,937,101 A | 8/1999 | Jeon et al. | |
| 6,320,905 B1 | 11/2001 | Konstantinides | |
| 6,993,191 B2 | 1/2006 | Petrescu | |
| 7,359,565 B2 | 4/2008 | Ratakonda et al. | |
| 7,362,810 B2 | 4/2008 | Wang | |
| 7,397,854 B2 | 7/2008 | Kwon et al. | |
| 7,426,315 B2 | 9/2008 | Frishman et al. | |
| 7,539,248 B2 | 5/2009 | Kwon et al. | |
| 7,724,307 B2 * | 5/2010 | Wan et al. | 348/620 |
| 7,760,964 B2 * | 7/2010 | Wang | 382/275 |
| 7,860,167 B2 * | 12/2010 | Le Dinh et al. | 375/240.2 |

(Continued)

FOREIGN PATENT DOCUMENTS

TW 201101838 A 1/2011

OTHER PUBLICATIONS

Office Action from Taiwan Patent Application No. 102148394, dated May 15, 2015.

*Primary Examiner* — Ishrat I Sherali
(74) *Attorney, Agent, or Firm* — Zilka-Kotab, PC (57) ABSTRACT

A method includes determining, through a processor and/or a hardware engine, edge pixels and flat pixels of a video frame of a video sequence during decoding thereof or post-processing associated with the decoding based on a predetermined threshold, and quantifying spatial correlation of pixels of the video frame around edges thereof to estimate strength of ringing artifacts and spatial and temporal persistence thereof across the video frame and across video frames of the video sequence. The method also includes adaptively and spatially filtering the pixels around the edges of the video frame, adaptively and temporally filtering the video frame, and blending an output of the adaptive spatial filtering and the adaptive temporal filtering to generate an output with suppressed ringing artifacts, spatial and temporal persistence thereof and artifacts resulting from the cumulative effect of compression therein.

20 Claims, 6 Drawing Sheets

(56) References Cited

U.S. PATENT DOCUMENTS

| | | | |
|---|---|---|---|
| 7,952,646 B2* | 5/2011 | Chiu | 348/607 |
| 8,063,995 B2* | 11/2011 | Xu et al. | 348/701 |
| 8,265,421 B2 | 9/2012 | Zhang et al. | |
| 8,305,497 B2* | 11/2012 | Winger | 348/607 |
| 8,306,355 B2 | 11/2012 | Su et al. | |
| 8,447,130 B2* | 5/2013 | Chiu | 382/261 |
| 8,564,724 B2* | 10/2013 | Hong et al. | 348/614 |
| 8,811,757 B2* | 8/2014 | Batur | 382/236 |
| 8,885,969 B2* | 11/2014 | Springer et al. | 382/268 |
| 2010/0322304 A1 | 12/2010 | Lee et al. | |
| 2011/0235921 A1 | 9/2011 | Springer et al. | |
| 2011/0242422 A1 | 10/2011 | Hong et al. | |

\* cited by examiner

ADAPTIVE FILTERING MECHANISM TO REMOVE ENCODING ARTIFACTS IN VIDEO DATA

FIELD OF TECHNOLOGY

This disclosure relates generally to video processing and, more particularly, to an adaptive filtering mechanism to remove encoding artifacts in video data.

BACKGROUND

A user experience on a data processing device (e.g., a laptop computer, a mobile device) having video processing capability may be dependent on a quality of video playback thereon. Video encoding techniques may produce digital artifacts that vary in objectionability based on factors such as a chosen bit rate. Therefore, the playback content may suffer from an effect of a combination of digital artifacts that are objectionable at various bit rates. As the video content may also be viewed on large display units (e.g., display units of High-Definition Television (HDTV) sets), the aforementioned artifacts may be even more perceptible and objectionable. In particular, ringing artifacts and mosquito noise artifacts near edges of objects on a video frame may be objectionable because of presence thereof near boundaries of the objects.

SUMMARY

Disclosed are a method, a device and/or a system of an adaptive filtering mechanism to remove encoding artifacts in video data.

In one aspect, a method includes determining, through a processor of a data processing device communicatively coupled to a memory and/or a hardware engine, edge pixels and flat pixels of a video frame of a video sequence during decoding thereof or post-processing associated with the decoding based on a predetermined threshold. The edge pixels are associated with one or more edge(s) of the video frame around which there is a change in intensity level above a threshold value thereof and the flat pixels are associated with one or more area(s) of the video frame around which the change in the intensity level is below the threshold value.

The method also includes quantifying, through the processor and/or the hardware engine, spatial correlation of pixels of the video frame around the one or more edge(s) to estimate a strength of ringing artifacts therein, persistence of the ringing artifacts within the video frame and temporal persistence thereof across the video frame and another video frame of the video sequence based on the determined edge pixels and the flat pixels and a raw output of the decoding. Further, the method includes adaptively and spatially filtering, through an edge preserving filter implemented through executing instructions on the processor and/or the hardware engine, the pixels around the one or more edge(s) of the video frame based on metadata associated with the video sequence, the estimated strength of the ringing artifacts, the persistence of the ringing artifacts within the video frame and the temporal persistence of the ringing artifacts across the video frame and the another video frame.

Still further, the method includes adaptively and temporally filtering, through the processor and/or the hardware engine, the video frame to mitigate artifacts resulting from a cumulative effect of compression during the encoding of the video sequence, and blending, through the processor and/or the hardware engine, an output of the adaptive spatial filtering and the adaptive temporal filtering to generate an output with suppressed ringing artifacts, spatial and temporal persistence thereof and artifacts resulting from the cumulative effect of compression therein.

In another aspect, a data processing device includes a memory, and a processor communicatively coupled to the memory. The processor is configured to execute instructions to determine edge pixels and flat pixels of a video frame of a video sequence during decoding thereof or post-processing associated with the decoding based on a predetermined threshold. The edge pixels are associated with one or more edge(s) of the video frame around which there is a change in intensity level above a threshold value thereof and the flat pixels are associated with one or more area(s) of the video frame around which the change in the intensity level is below the threshold value.

The processor is also configured to execute instructions to quantify spatial correlation of pixels of the video frame around the one or more edge(s) to estimate a strength of ringing artifacts therein, persistence of the ringing artifacts within the video frame and temporal persistence thereof across the video frame and another video frame of the video sequence based on the determined edge pixels and the flat pixels and a raw output of the decoding. Further, the processor is configured to execute instructions to adaptively and spatially filter, through an edge preserving filter, the pixels around the one or more edge(s) of the video frame based on metadata associated with the video sequence, the estimated strength of the ringing artifacts, the persistence of the ringing artifacts within the video frame and the temporal persistence of the ringing artifacts across the video frame and the another video frame.

Still further, the processor is configured to execute instructions to adaptively and temporally filter the video frame to mitigate artifacts resulting from a cumulative effect of compression during the encoding of the video sequence, and to blend an output of the adaptive spatial filtering and the adaptive temporal filtering to generate an output with suppressed ringing artifacts, spatial and temporal persistence thereof and artifacts resulting from the cumulative effect of compression therein.

In yet another aspect, a system includes a data source configured to generate video data encoded as a video sequence, and a hardware engine and/or a client device communicatively coupled to the data source. The hardware engine and/or the client device is configured to determine edge pixels and flat pixels of a video frame of the video sequence during decoding thereof or post-processing associated with the decoding based on a predetermined threshold. The edge pixels are associated with one or more edge(s) of the video frame around which there is a change in intensity level above a threshold value thereof and the flat pixels are associated with one or more area(s) of the video frame around which the change in the intensity level is below the threshold value.

The hardware engine and/or the client device is also configured to quantify spatial correlation of pixels of the video frame around the one or more edge(s) to estimate a strength of ringing artifacts therein, persistence of the ringing artifacts within the video frame and temporal persistence thereof across the video frame and another video frame of the video sequence based on the determined edge pixels and the flat pixels and a raw output of the decoding. The hardware engine and/or the client device is further configured to adaptively and spatially filter, through an edge preserving filter, the pixels around the one or more edge(s) of the video frame based on metadata associated with the video sequence, the estimated strength of the ringing artifacts, the persistence of the ringing artifacts within the video frame and the temporal persistence of the ringing artifacts across the video frame and the another video frame.

Still further, the hardware engine and/or the client device is configured to adaptively and temporally filter the video frame to mitigate artifacts resulting from a cumulative effect of compression during the encoding of the video sequence, and to blend an output of the adaptive spatial filtering and the adaptive temporal filtering to generate an output with suppressed ringing artifacts, spatial and temporal persistence thereof and artifacts resulting from the cumulative effect of compression therein.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device, and/or a system of an adaptive filtering mechanism to remove encoding artifacts in video data. Although the present embodiments have been described with reference to specific example embodiments, it will be evident that various modifications and changes may be made to these embodiments without departing from the broader spirit and scope of the various embodiments.

Figure 1:
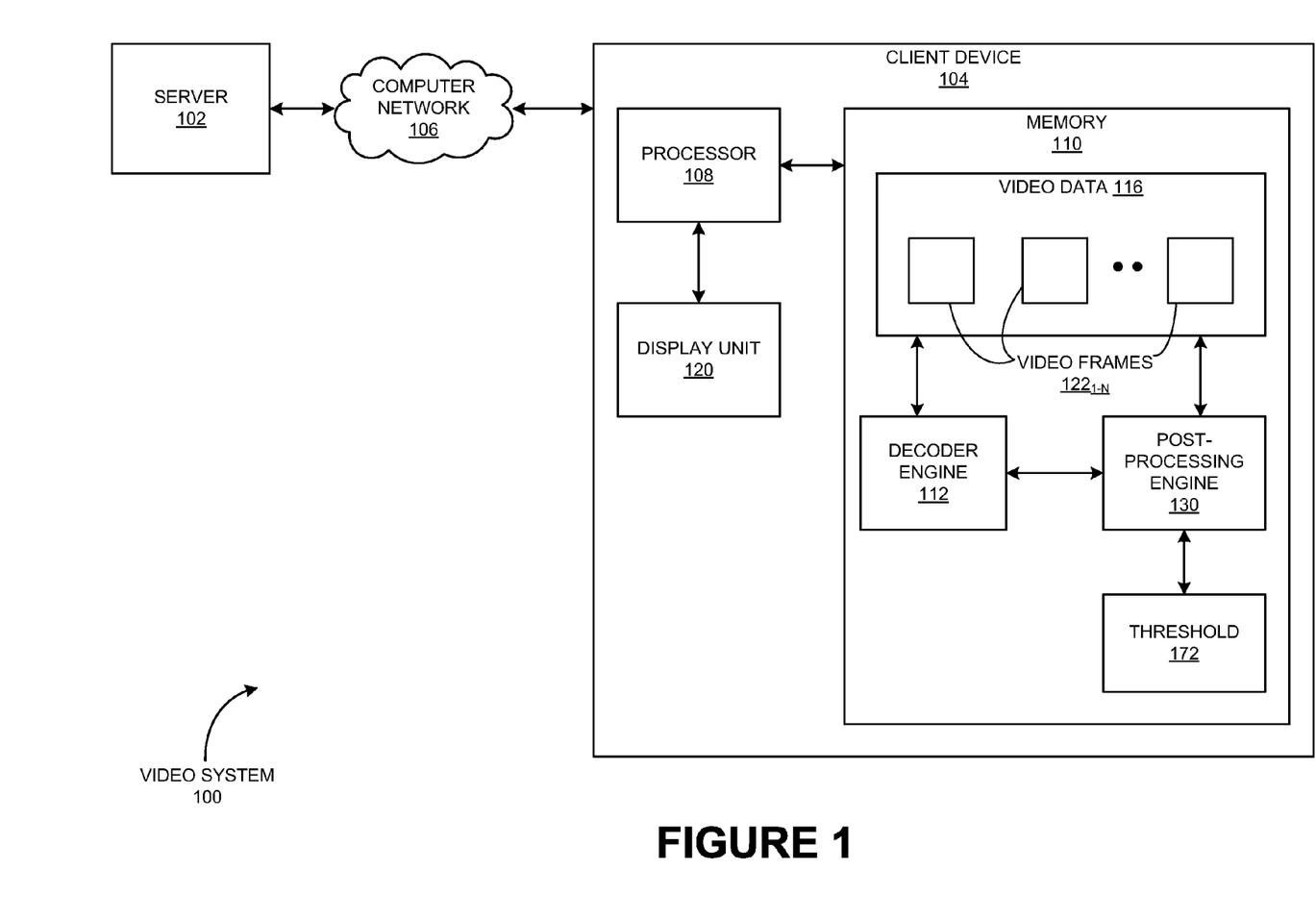
FIG. 1 is a schematic view of a video system, according to one or more embodiments

FIG. 1 is a schematic diagram of a video system 100, according to one or more embodiments. In one or more embodiments, video system 100 may include a server 102 communicatively coupled to a client device 104 (e.g., through a computer network 106). In one or more embodiments, server 102 (or, a data source) may be configured to generate video data that is encoded as a video sequence and transmitted to client device 104. In one or more embodiments, the transmitted video data may be decoded at client device 104 and rendered on a display unit 120 associated therewith. In one or more embodiments, client device 104 may be a desktop computer, a laptop computer, a notebook computer, a netbook, tablet or a mobile device such as a mobile phone. Other forms of client device 104 are within the scope of the exemplary embodiments discussed herein. In an alternate example embodiment, server 102 and client device 104 may be a same data processing device.

In one or more embodiments, client device 104 may include a processor 108 (e.g., a Central Processing Unit (CPU), a Graphics Processing Unit (GPU)) communicatively coupled to a memory 110 (e.g., a volatile memory and/or a non-volatile memory); memory 110 may include storage locations addressable through processor 108. In one or more embodiments, processor 108 may execute a decoder engine 112 (e.g., a set of instructions) thereon to decode the received video data (e.g., video data 116) to enable rendering thereof on display unit 120; display unit 120 is shown as being interfaced with processor 108 in FIG. 1. FIG. 1 also shows decoder engine 112 as being stored in memory 110 to be executed through processor 108; further, FIG. 1 shows video data 116 as being stored in memory 110 (e.g., volatile memory).

In one or more embodiments, processor 108 may also execute a post-processing engine 130 thereon (again, shown as being part of memory 110 by way of an output of decoder engine 112 being applied thereto). In one or more embodiments, post-processing engine 130 may process the output of decoder engine 112 (e.g., video data 116) to suppress/mitigate encoding related ringing/mosquito noise artifacts therein, as will be discussed below. In one or more alternate embodiments, post-processing engine 130 may be part of decoder engine 112. It should be noted that video system 100 may require real-time processing to suppress/mitigate the aforementioned artifacts. Accordingly, while exemplary embodiments discussed herein may preferentially be directed to addressing such requirements, more computationally expensive solutions are also within the scope thereof.

Figure 2:
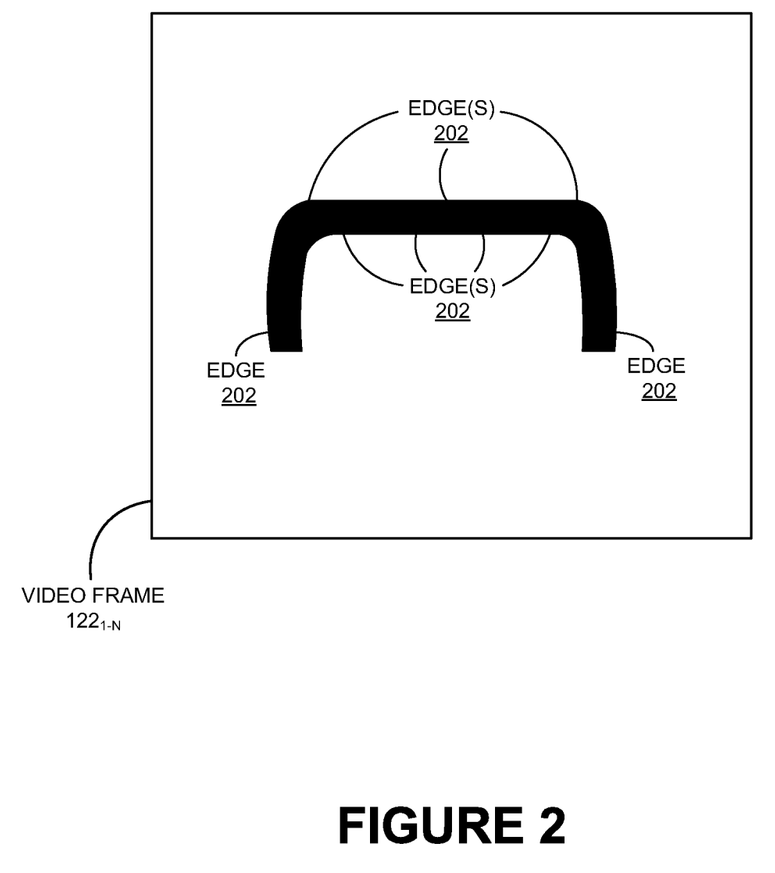
FIG. 2 is a schematic view of an example edge in a simplified video frame.

In one or more embodiments, video data 116 may include a number of video frames (e.g., video frames $122_{1-N}$) that are scanned (e.g., through processor 108) to preserve edges thereof. In one or more embodiments, an edge may be a point of a video frame $122_{1-N}$ around which there is a change in intensity level above a threshold value (e.g., threshold 172 stored in memory 110). FIG. 2 shows an example of an edge 202 in a simplified video frame $122_{1-N}$. In one or more embodiments, each video frame $122_{1-N}$ may be scanned to identify areas thereof associated with prospective artifact manifestations and to discard other areas. In other words, in one or more embodiments, edges of video data 116 may be preserved.

In one example implementation, a Sobel operator may be utilized to compute an approximate gradient of an intensity level function of video frame $122_{1-N}$ as part of the edge detection discussed above. The Sobel operator is well known to one skilled in the art; therefore, detailed discussion associated therewith has been skipped for the sake of convenience and brevity. Other methods to approximate gradients are within the scope of the exemplary embodiments discussed herein.

Video compression/coding methods may cause artifacts to manifest during rendering of video data 116 that vary in objectionability based on a chosen bit rate. A strong edge against a flat background in video frame $122_{1-N}$ may lead to manifestation of ringing artifacts. Thus, in one or more embodiments, the process/processes discussed above may identify areas of video frames $122_{1-N}$ where ringing artifacts may manifest and discard all other areas, thereby eliminating a possibility of false positives.

Figure 3:
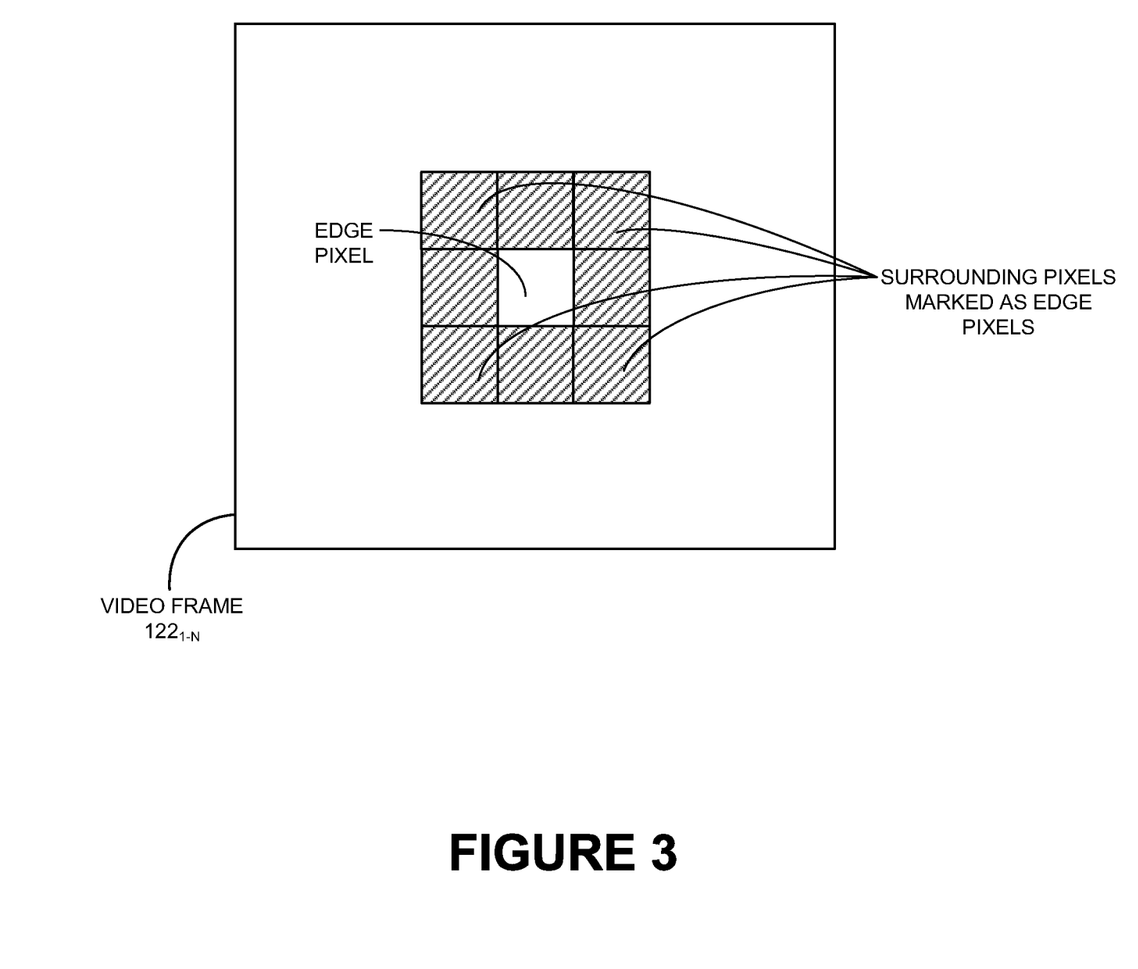
FIG. 3 is a schematic view of marking of pixels of a video frame around an edge pixel thereof to widen a contour of an edge associated therewith, according to one or more embodiments.

In one or more embodiments, based on the edge computation discussed above, pixels of video frame $122_{1-N}$ may be classified as edge pixels and flat pixels in accordance with whether the intensity level associated with a pixel exceeds that of a preceding pixel by a threshold level. In one or more embodiments, for each edge pixel, pixels surrounding said edge pixel may also be marked (e.g., through processor 108) as edge pixels. Thus, in one or more embodiments, edge contours within a video frame $122_{1-N}$ may be widened. For example, in the case of pixels in a middle portion of a video frame $122_{1-N}$, an edge contour may be 3 pixel-wide. FIG. 3 shows the aforementioned marking within an example video frame $122_{1-N}$. It should be noted that the edge widening process described herein may also be adapted based on metadata (e.g., size of display unit 120) associated with the video sequence.

In one or more embodiments, post-processing engine 130 may also have instructions associated with range analysis implemented therein. In one or more embodiments, a range may be computed for each sub-block (e.g., an 8×8 block) of video frame $122_{1-N}$ as a difference between a maximum and a minimum value of intensity values of pixels therewithin. In one or more embodiments, the range may then be compared with a threshold (e.g., preset and determined based on experimentation) based on which pixels of the block are marked as flat pixels and edge pixels. For example, if the computed range is less than the threshold, all pixels of the block may be marked as flat pixels. If the computed range is more than the threshold, then all pixels of the block may be marked as edge pixels.

In one or more embodiments, the range analysis may be performed to render an extent of infallibility to the edge detection process by way of reducing the false positives and/or the false negatives. Now, in one or more embodiments, the flat pixel percentage and the edge pixel percentage may be calculated for each sub-block of video frame $122_{1-N}$. Then, in one or more embodiments, if the flat pixel percentage within the sub-block is higher than a threshold (e.g., 90%), the sub-block may be preserved and pixels thereof not filtered. This may be done to avoid filtering of flat regions of video frame $122_{1-N}$ having a low probability of occurrence of ringing artifacts. In one or more embodiments, if the edge pixel percentage within the sub-block is higher than another threshold (e.g., 40%), the sub-block, again, may be preserved and pixels thereof not filtered. This may be done to avoid filtering of highly populated edge regions of video frame $122_{1-N}$. In one or more embodiments, the pixels excluding the preserved pixels may be classified as candidate pixels for filtering.

In one or more embodiments, strength of the possible ringing artifacts and persistence thereof may then be quantified based on analyzing the candidate pixels. In one or more embodiments, the strength of ringing may be computed through normalized correlation between sub-blocks of video frame $122_{1-N}$ around "edges" (e.g., edge pixels). Further, in one or more embodiments, the computations take into account the modification of the strength of ringing due to persistence of spatial correlation. Also, in one or more embodiments, temporal persistence of the ringing may be tracked across multiple video frames $122_{1-N}$.

In one or more embodiments, spatial correlation across pixels of video frame $122_{1-N}$ and persistence thereof may enable identification of areas (or, pixels) of video frame $122_{1-N}$ associated with possible ringing artifacts and quantifying the strength thereof. In other words, two things may be quantified: strength of correlation and persistence thereof across pixels of video frame $122_{1-N}$ and across video frames $122_{1-N}$. It should be noted that temporal persistence and correlation between video frames $122_{1-N}$ may be quantified in accordance with mathematical functions. However, considering the real-time nature of implementation scenarios in which concepts discussed herein are involved, temporal correlation calculation in accordance with mathematical functions may be computationally expensive and/or questionably feasible. Nevertheless, implementations involving such mathematical functions are within the scope of the exemplary embodiments discussed herein.

In one or more embodiments, parameters such as noise floor may, therefore, be estimated. For example, the noise floor may be low at the edge pixels and high in a middle portion of video frame $122_{1-N}$. In one or more embodiments, pixels around the edges (or, candidate pixels) may be filtered through an edge preserving filter (e.g., a bilateral filter) to remove the ringing artifacts. In one or more embodiments, temporal filtering may also be employed to remove artifacts (e.g., mosquito noise artifacts) that result from a cumulative effect of compression during the encoding of video data 116. In one or more embodiments, filtered pixels of video frames $122_{1-N}$ may then be combined with non-filtered pixels thereof to generate a final output having reduced ringing/mosquito noise artifacts therein.

Figure 4:
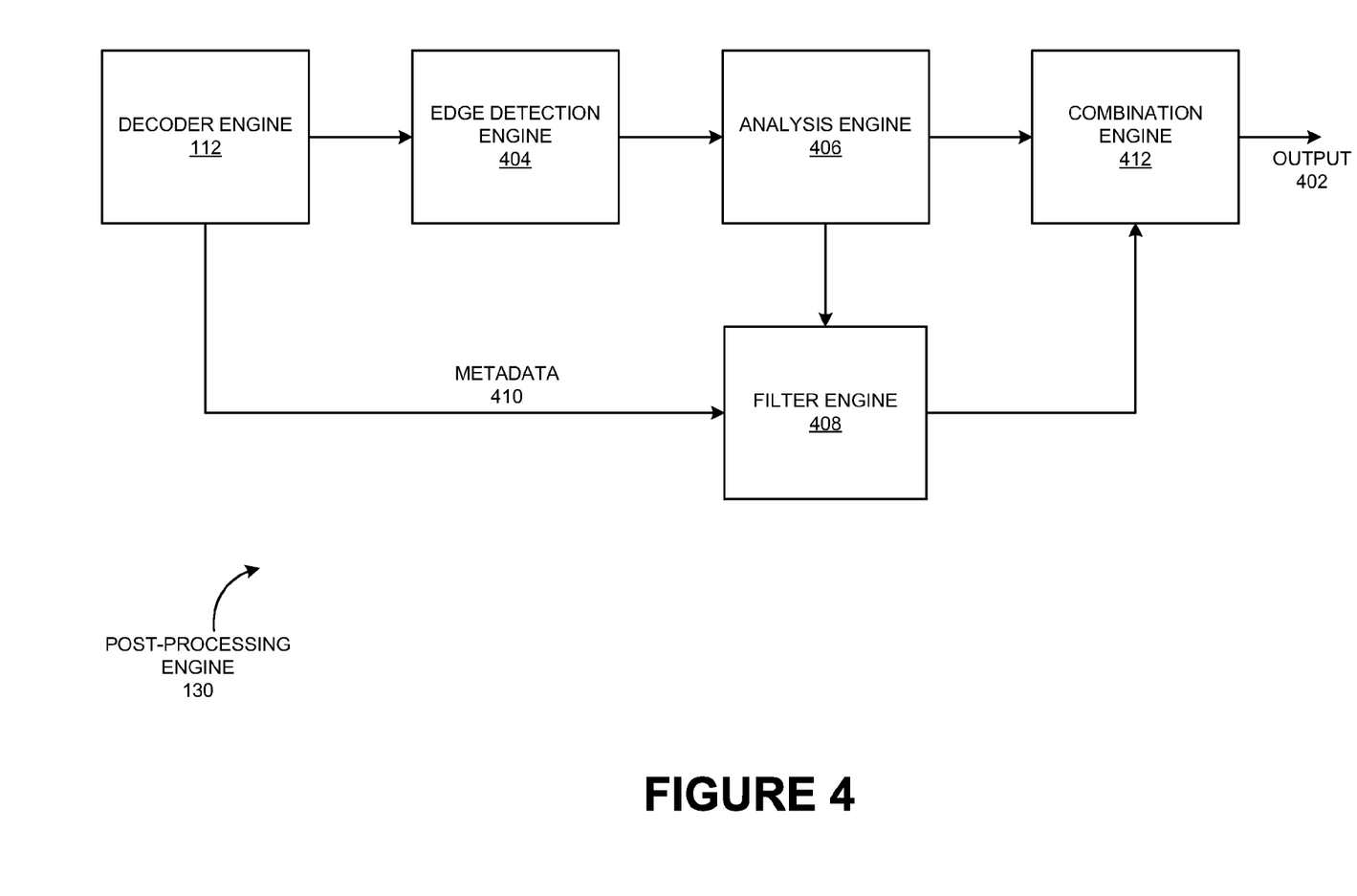
FIG. 4 is a schematic view of an implementation of a post-processing engine executing on a client device of the video system of FIG. 1.

FIG. 4 shows an implementation of post-processing engine 130, according to one or more embodiments. In one or more embodiments, post-processing engine 130 may be configured to receive an output (e.g., raw video data 116) of decoder engine 112 and process said output to generate the final output (e.g., output 402) having reduced ringing/mosquito noise artifacts therein. In one or more embodiments, post-processing engine 130 may include an edge detection engine 404 configured to perform the edge detection discussed above; the output of edge detection engine 404 may then be fed to an analysis engine 406 configured to perform the edge analysis discussed above to generate the edge pixels and the flat pixels of video frames $122_{1-N}$. In one or more embodiments, pixels around the edges may be adaptively filtered through execution of filter engine 408 spatially and temporally with metadata 410 (e.g., Quantization Parameter (QP) during encoding, encoding type) from decoder engine 112 serving as a reference input thereof.

It should be noted that metadata 410 as discussed herein may be information at one or more levels that is utilized appropriately for the adaptation discussed herein. At a high level, metadata 410 may be a type of display unit 120; artifacts may manifest more in a large display unit 120 or a display unit 120 of a HDTV set/4KTV set than in a small display unit 120. Also, metadata 410 may be a classifier (e.g., low bit rate, high bit rate) of video data 116 based on parameters such as frame rate, frame size and bit rate, and/or a type of codec. At a lower level, metadata 410 may be an average quantization level and/or parameters of the like associated with decoder engine 112. The aforementioned quantization level may be understood as an adaptation factor at a level of video frame(s) $122_{1-N}$. At the lowest level, video pixel analysis (e.g., through analysis engine 406) may be utilized to adapt the filtering, with the high level metadata 410 as a reference.

In one or more embodiments, the outputs of analysis engine 406 and filter engine 408 may then be combined (e.g., through a combination engine 412) to generate output 402. In one or more embodiments, the spatial component of filter engine 408 may be implemented through an edge preserving filter. An example of an edge preserving filter is a bilateral filter, whose output may generically be represented as:

$$BF[I]_p = \frac{1}{W_p} \sum_{q \in S} G_{\sigma_s}(\|p-q\|) G_{\sigma_r}(|I_p - I_q|) I_q \qquad (1)$$

In words, for an input video frame $122_{1-N}$ I, the output $BF[I]_p$ for a pixel p may be expressed as example equation (1). Here, $\sigma_s$ and $\sigma_r$ are the spatial deviation and the radiometric deviation respectively; $G_{\sigma_s}$ is a Gaussian function associated with spatial location and $G_{\sigma_r}$ is a Gaussian function associated with pixel intensity (range); and the normalization factor $W_p$ is given by:

$$W_p = \Sigma_{q \in S} G_{\sigma_s}(\|p-q\|) G_{\sigma_r}(|I_p - I_q|) \qquad (2)$$

The normalization factor may ensure that filter weights for all pixels add up to 1. Thus, the weights of the bilateral filter may depend on both the spatial Gaussian function and the range Gaussian function. The bilateral filter may be adapted by varying $\sigma_s$ and/or $\sigma_r$. In an example implementation, $\sigma_s$ may be tuned separately for luma and chroma values based on previously computed statistics. In the case of the range portion, $\sigma_r$ may balance de-ringing and feature preservation, and may also be tuned based on previously computed statistics. The bilateral filtering may then be adaptively applied to the pixels around the edges (or, candidate pixels), as discussed above.

In an example implementation, temporal filtering may be realized through a first-order Infinite Impulse Response (IIR) filter to generate an output y(t) by recursively applying alpha-blending of a current video frame $122_{1-N}$ x(t) with a previous temporally filtered video frame $122_{1-N}$ y(t−1). In short, $$y(t) = \alpha y(t-1) + (1-\alpha) x(t), \qquad (3)$$

where $0 < \alpha < 1$.

Further, spatially ($y_s(t)$) and temporally ($y_t(t)$) filtered images may then be blended together to generate a final output ($y_o(t)$) as:

$$y_o(t) = \beta y_s(t) + (1-\beta) y_t(t), \qquad (4)$$

where $0 \le \beta \le 1$. It is obvious that the lower and the upper limits of $\beta$ represent purely temporal and purely spatial filtering respectively.

It should be noted that the bilateral filter and the IIR filter discussed above are merely shown for example purposes. Other edge preserving filters and temporal filters are within the scope of the exemplary embodiments discussed herein. Also, the Gaussian functions and the first-order nature of the IIR filter discussed above are also for example implementation purposes. Other simpler or complex functions are also within the scope of the exemplary embodiments discussed herein.

Figure 5:
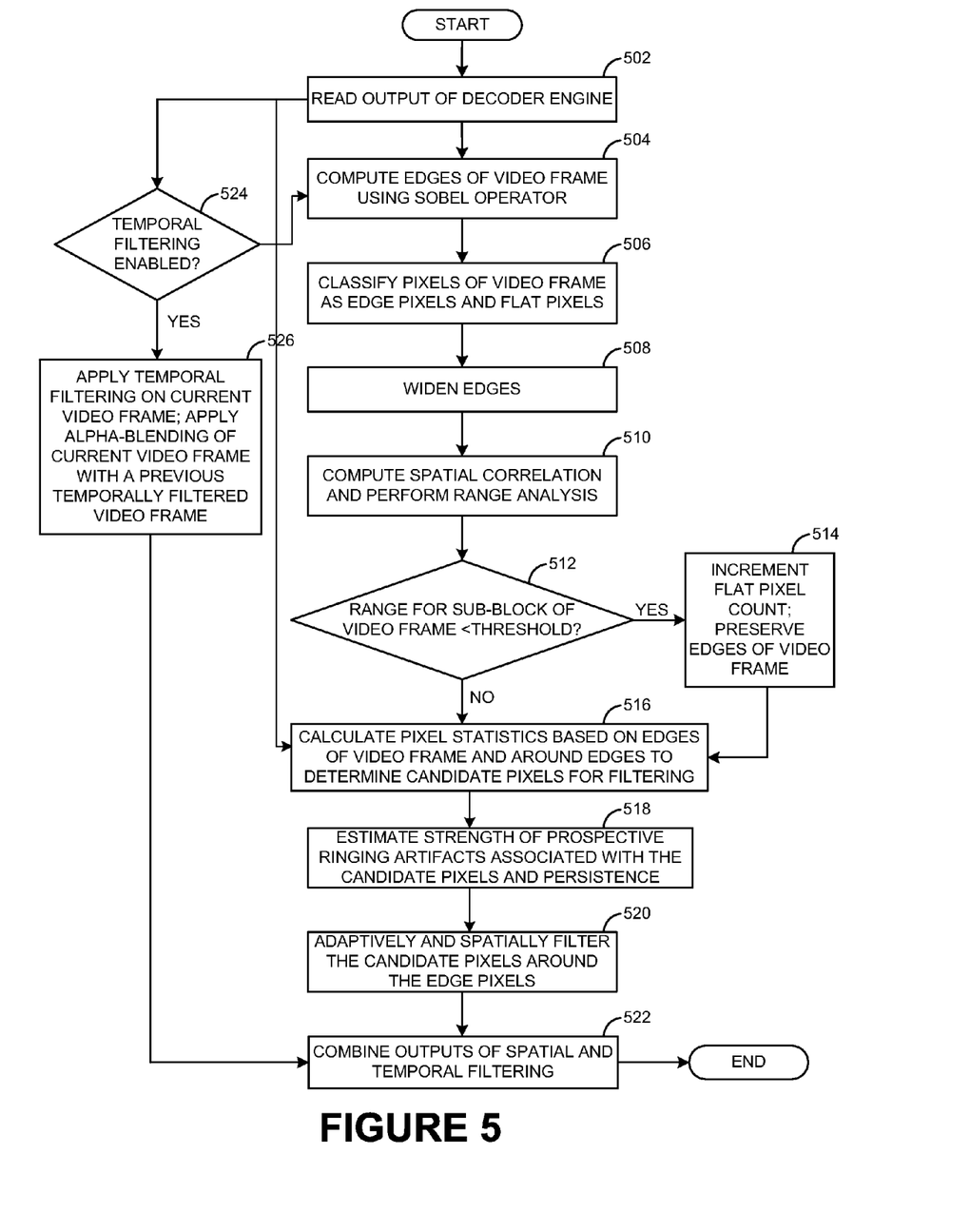
FIG. 5 is a flowchart detailing the operations involved in an adaptive filtering mechanism to remove encoding artifacts in video data of FIG. 1, according to one or more embodiments.

FIG. 5 shows a flowchart summarizing the adaptive filtering mechanism discussed above to remove encoding artifacts in video data 116, according to one or more embodiments. In one or more embodiments, operation 502 may involve reading (e.g., through processor 108) an output of decoder engine 112. In one or more embodiments, operation 504 may involve computation of edges of each video frame $122_{1-N}$ of video data 116 using a Sobel operator. In one or more embodiments, operation 506 may involve classification of pixels of video frame $122_{1-N}$ as edge pixels and flat pixels. In one or more embodiments, operation 508 may involve widening of edges, as discussed above. In one or more embodiments, operation 510 may involve correlation computation and range analysis, again, as discussed above.

In one or more embodiments, operation 512 may involve comparison of the calculated range for each sub-block of video frame $122_{1-N}$ with a threshold. In one or more embodiments, if the result of operation 512 yields that the range is less than the threshold, operation 514 may involve incrementing a count for a number of flat pixels. Also, in one or more embodiments, operation 514 may involve preserving edges of video frame $122_{1-N}$ by not filtering edge pixels thereof. In one or more embodiments, operation 516 may involve calculating pixel statistics based on edges of video frame $122_{1-N}$, and pixel statistics around edges of video frame $122_{1-N}$ to determine candidate pixels for filtering as discussed above. In one or more embodiments, operation 518 may involve estimation of the strength of the prospective ringing artifacts associated with the candidate pixels and persistence thereof within video frame $122_{1-N}$ and across video frames $122_{1-N}$ based on the statistics and the output of decoder engine 112.

In one or more embodiments, operation 520 may involve adaptively and spatially filtering the candidate pixels around the edge pixels, as discussed above. In one or more embodiments, operation 522 may then involve combining the outputs of the spatial filtering and a temporal filtering based on a blending factor ($\beta$ of example Equation (4)). With regard to the result of operation 502, in one or more embodiments, a parallel operation 524 may involve checking as to whether temporal filtering is enabled. In one or more embodiments, if yes, operation 526 may involve application of temporal filtering on current video frame $122_{1-N}$ (e.g., through a first-order IIR filter). Also, in one or more embodiments, operation 526 may involve application of alpha-blending ($\alpha$ of example Equation (3)) of current video frame $122_{1-N}$ with a previous temporally filtered video frame $122_{1-N}$. In one or more embodiments, control may then be passed to operation 522 where the outputs of the spatial filtering and the temporal filtering are combined.

It should be noted that the processes discussed above may be performed through decoder engine 112 and/or post-processing engine 130 executing on processor 108. Alternately, decoder engine 112 and/or post-processing engine 130 may be hardware engines. A combination of hardware and software may also be possible.

In one or more embodiments, the edge preserving filter discussed above may be adapted based on metadata (e.g., quantization step, video standard) from decoder engine 112, strength of the ringing artifacts and persistence thereof et al. Some examples of adaptation include low bit rate adaptation in accordance with a high quantization step and vice versa, video standard adaptation, adaptation of spatial extent and range parameters of the edge preserving filter (e.g., bilateral filter) in accordance with ringing strength within video frame $122_{1-N}$, and increasing de-ringing strength as persistence of the ringing artifacts across multiple video frames $122_{1-N}$ increases. Other forms of metadata (e.g., metadata 410 discussed with regard to FIG. 4) are within the scope of the exemplary embodiments discussed herein.

Several implementation scenarios may be envisioned for the exemplary embodiments discussed herein. For example, concepts discussed herein may be employed in handheld devices to improve multimedia playback experience, digital television sets coupled to handheld devices, smart television boxes for noise free rendering and gaming consoles utilized for video playback. Other implementations are within the scope of the exemplary embodiments discussed herein.

Figure 6:
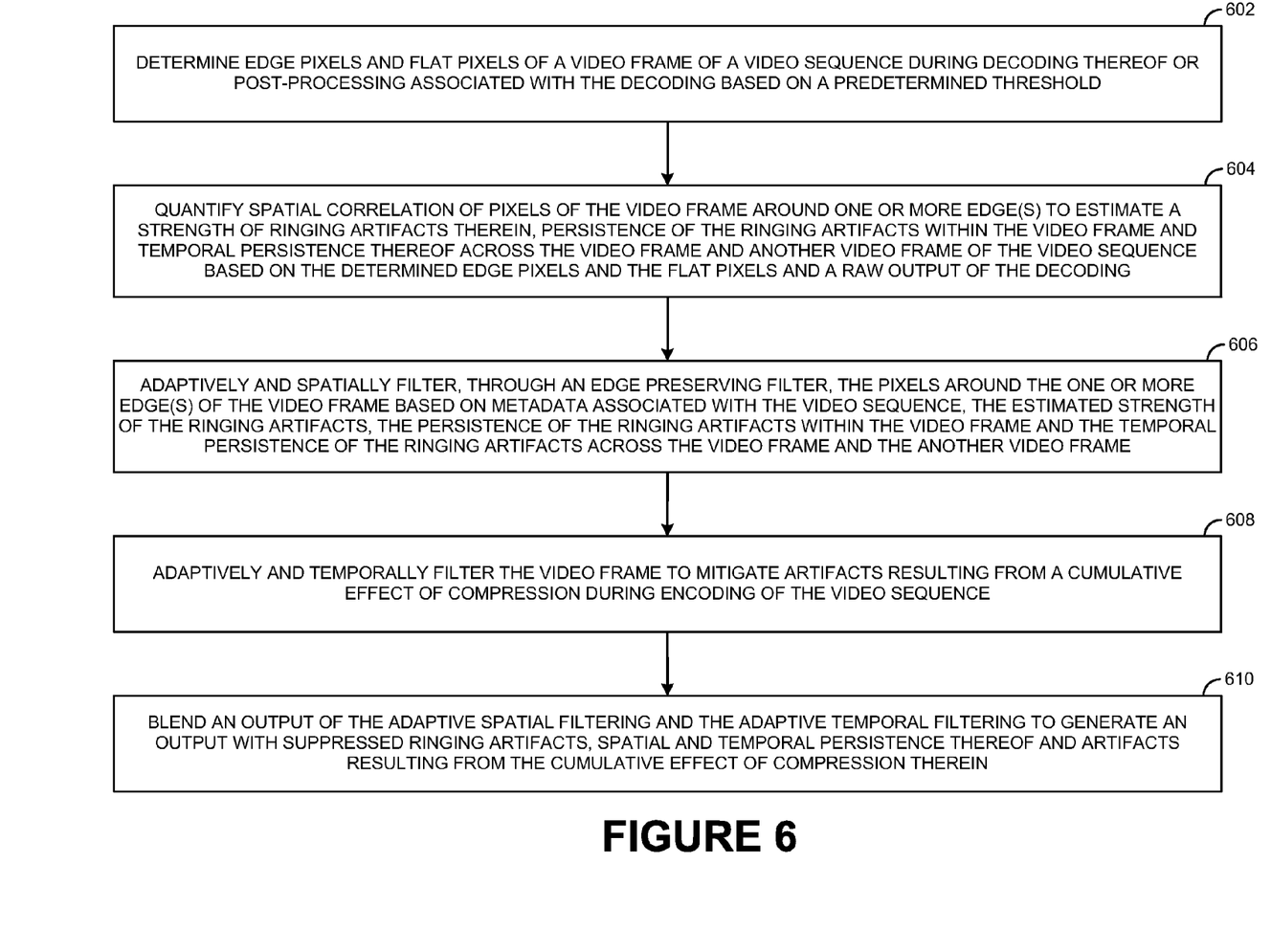
FIG. 6 is a process flow diagram detailing the operations involved in an adaptive filtering mechanism to remove encoding artifacts in the video data of FIG. 1, according to one or more embodiments.

It should be noted that while video frames have been discussed throughout the detailed description, concepts associated with the exemplary embodiments are also applicable to images. FIG. 6 shows a process flow diagram detailing the operations involved in an adaptive filtering mechanism to remove encoding artifacts in video data 116, according to one or more embodiments. In one or more embodiments, operation 602 may involve determining, through processor 108 and/or a hardware engine, edge pixels and flat pixels of a video frame $122_{1\text{-}N}$ of a video sequence during decoding thereof or post-processing associated with the decoding based on a predetermined threshold. In one or more embodiments, the edge pixels may be associated with one or more edge(s) of video frame $122_{1\text{-}N}$ around which there is a change in intensity level above a threshold value thereof and the flat pixels being associated with one or more area(s) of video frame $122_{1\text{-}N}$ around which the change in the intensity level is below the threshold value.

In one or more embodiments, operation 604 may involve quantifying, through processor 108 and/or the hardware engine, spatial correlation of pixels of video frame $122_{1\text{-}N}$ around the one or more edge(s) to estimate a strength of ringing artifacts therein, persistence of the ringing artifacts within video frame $122_{1\text{-}N}$ and temporal persistence thereof across video frame $122_{1\text{-}N}$ and another video frame $122_{1\text{-}N}$ of the video sequence based on the determined edge pixels and the flat pixels and a raw output of the decoding. In one or more embodiments, operation 606 may involve adaptively and spatially filtering, through an edge preserving filter implemented through executing instructions on processor 108 and/or the hardware engine, the pixels around the one or more edge(s) of video frame $122_{1\text{-}N}$ based on metadata associated with the video sequence, the estimated strength of the ringing artifacts, the persistence of the ringing artifacts within video frame $122_{1\text{-}N}$ and the temporal persistence of the ringing artifacts across video frame $122_{1\text{-}N}$ and the another video frame $122_{1\text{-}N}$.

In one or more embodiments, operation 608 may involve adaptively and temporally filtering, through processor 108 and/or the hardware engine, video frame $122_{1\text{-}N}$ to mitigate artifacts resulting from a cumulative effect of compression during encoding of the video sequence. In one or more embodiments, operation 610 may then involve blending, through processor 108 and/or the hardware engine, an output of the adaptive spatial filtering and the adaptive temporal filtering to generate an output with suppressed ringing artifacts, spatial and temporal persistence thereof and artifacts resulting from the cumulative effect of compression therein.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., client device 104). Accordingly, the specification and drawings are to be regarded in an illustrative rather than a restrictive sense.

What is claimed is:

1. A method comprising:
   determining, through at least one of a processor of a data processing device communicatively coupled to a memory and a hardware engine, edge pixels and flat pixels of a video frame of a video sequence during one of decoding thereof and post-processing associated with the decoding based on a predetermined threshold, the edge pixels being associated with at least one edge of the video frame around which there is a change in intensity level above a threshold value thereof and the flat pixels being associated with at least one area of the video frame around which the change in the intensity level is below the threshold value;
   quantifying, through the at least one of the processor and the hardware engine, spatial correlation of pixels of the video frame around the at least one edge to estimate a strength of ringing artifacts therein, persistence of the ringing artifacts within the video frame and temporal persistence thereof across the video frame and another video frame of the video sequence based on the determined edge pixels and the flat pixels and a raw output of the decoding;
   adaptively and spatially filtering, through an edge preserving filter implemented through at least one of: executing instructions on the processor and the hardware engine, the pixels around the at least one edge of the video frame based on metadata associated with the video sequence, the estimated strength of the ringing artifacts, the persistence of the ringing artifacts within the video frame and the temporal persistence of the ringing artifacts across the video frame and the another video frame;
   adaptively and temporally filtering, through the at least one of the processor and the hardware engine, the video frame to mitigate artifacts resulting from a cumulative effect of compression during encoding of the video sequence; and
   blending, through the at least one of the processor and the hardware engine, an output of the adaptive spatial filtering and the adaptive temporal filtering to generate an output with suppressed ringing artifacts, spatial and temporal persistence thereof and artifacts resulting from the cumulative effect of compression therein.

2. The method of claim 1, wherein determining the edge pixels and the flat pixels further comprises at least one of:
   estimating the at least one edge of the video frame;
   marking at least one pixel surrounding an edge pixel also as an edge pixel to widen a contour of the at least one edge;
   computing a range for each sub-block of the video frame as a difference between a maximum and a minimum of intensity levels of pixels therewithin;
   comparing the range for the each sub-block to another predetermined threshold to determine the flat pixels and the edge pixels therewithin; and
   preserving the edge pixels within the each sub-block.

3. The method of claim 2, further comprising preventing filtering of the each sub-block when a flat pixel percentage and an edge pixel percentage thereof are respectively above a first threshold value and a second threshold value.

4. The method of claim 2, comprising computing an approximate gradient of an intensity level function of the video frame using a Sobel operator as part of the estimation of the at least one edge thereof.

5. The method of claim 1, comprising at least one of:
   implementing a bilateral filter having a spatial filter component and a range filter component as the edge preserving filter; and
   implementing a first-order Infinite Impulse Response (IIR) filter as a component performing the adaptive temporal filtering, the IIR filter being configured to generate an output by recursively applying alpha-blending of the video frame with a previous temporally filtered video frame of the video sequence.

6. The method of claim 5, further comprising adapting the bilateral filter through varying at least one of a deviation parameter associated with the spatial filter component and a radiometric deviation parameter associated with the range filter component.

7. The method of claim 6, comprising implementing the spatial filter component and the range filter component as Gaussian functions.

8. A data processing device comprising:
a memory; and
a processor communicatively coupled to the memory, the processor being configured to execute instructions to:
determine edge pixels and flat pixels of a video frame of a video sequence during one of decoding thereof and post-processing associated with the decoding based on a predetermined threshold, the edge pixels being associated with at least one edge of the video frame around which there is a change in intensity level above a threshold value thereof and the flat pixels being associated with at least one area of the video frame around which the change in the intensity level is below the threshold value,
quantify spatial correlation of pixels of the video frame around the at least one edge to estimate a strength of ringing artifacts therein, persistence of the ringing artifacts within the video frame and temporal persistence thereof across the video frame and another video frame of the video sequence based on the determined edge pixels and the flat pixels and a raw output of the decoding,
adaptively and spatially filter, through an edge preserving filter, the pixels around the at least one edge of the video frame based on metadata associated with the video sequence, the estimated strength of the ringing artifacts, the persistence of the ringing artifacts within the video frame and the temporal persistence of the ringing artifacts across the video frame and the another video frame,
adaptively and temporally filter the video frame to mitigate artifacts resulting from a cumulative effect of compression during encoding of the video sequence, and
blend an output of the adaptive spatial filtering and the adaptive temporal filtering to generate an output with suppressed ringing artifacts, spatial and temporal persistence thereof and artifacts resulting from the cumulative effect of compression therein.

9. The data processing device of claim 8, wherein the processor is configured to execute instructions to determine the edge pixels and the flat pixels based on:
estimating the at least one edge of the video frame,
marking at least one pixel surrounding an edge pixel also as an edge pixel to widen a contour of the at least one edge thereof,
computing a range for each sub-block of the video frame as a difference between a maximum and a minimum of intensity levels of pixels therewithin,
comparing the range for the each sub-block to another predetermined threshold to determine the flat pixels and the edge pixels therewithin, and
preserving the edge pixels within the each sub-block.

10. The data processing device of claim 9, wherein the processor is further configured to execute instructions to prevent filtering of the each sub-block when a flat pixel percentage and an edge pixel percentage thereof are respectively above a first threshold value and a second threshold value.

11. The data processing device of claim 9, wherein the processor is configured to execute instructions to compute an approximate gradient of an intensity level function of the video frame using a Sobel operator as part of the estimation of the at least one edge thereof.

12. The data processing device of claim 8, wherein the processor is configured to execute instructions associated with at least one of:
a bilateral filter having a spatial filter component and a range filter component as the edge preserving filter, and
a first-order IIR filter as a component performing the adaptive temporal filtering, the IIR filter being configured to generate an output by recursively applying alpha-blending of the video frame with a previous temporally filtered video frame of the video sequence.

13. The data processing device of claim 12, wherein the processor is further configured to execute instructions to adapt the bilateral filter through varying at least one of a deviation parameter associated with the spatial filter component and a radiometric deviation parameter associated with the range filter component.

14. The data processing device of claim 13, wherein the processor is configured to execute instructions associated with the spatial filter component and the range filter being Gaussian functions.

15. A system comprising:
a data source configured to generate video data encoded as a video sequence; and
at least one of a hardware engine and a client device communicatively coupled to the data source, the at least one of the hardware engine and the client device being configured to:
determine edge pixels and flat pixels of a video frame of the video sequence during one of decoding thereof and post-processing associated with the decoding based on a predetermined threshold, the edge pixels being associated with at least one edge of the video frame around which there is a change in intensity level above a threshold value thereof and the flat pixels being associated with at least one area of the video frame around which the change in the intensity level is below the threshold value,
quantify spatial correlation of pixels of the video frame around the at least one edge to estimate a strength of ringing artifacts therein, persistence of the ringing artifacts within the video frame and temporal persistence thereof across the video frame and another video frame of the video sequence based on the determined edge pixels and the flat pixels and a raw output of the decoding,
adaptively and spatially filter, through an edge preserving filter, the pixels around the at least one edge of the video frame based on metadata associated with the video sequence, the estimated strength of the ringing artifacts, the persistence of the ringing artifacts within the video frame and the temporal persistence of the ringing artifacts across the video frame and the another video frame,
adaptively and temporally filter the video frame to mitigate artifacts resulting from a cumulative effect of compression during encoding of the video sequence, and
blend an output of the adaptive spatial filtering and the adaptive temporal filtering to generate an output with suppressed ringing artifacts, spatial and temporal persistence thereof and artifacts resulting from the cumulative effect of compression therein.

16. The system of claim 15, wherein the at least one of the hardware engine and the client device is configured to determine the edge pixels and the flat pixels based on:
estimating the at least one edge of the video frame,
marking at least one pixel surrounding an edge pixel also as an edge pixel to widen a contour of the at least one edge thereof,
computing a range for each sub-block of the video frame as a difference between a maximum and a minimum of intensity levels of pixels therewithin,
comparing the range for the each sub-block to another predetermined threshold to determine the flat pixels and the edge pixels therewithin, and
preserving the edge pixels within the each sub-block.

17. The system of claim 16, wherein the at least one of the hardware engine and the client device is further configured to prevent filtering of the each sub-block when a flat pixel percentage and an edge pixel percentage thereof are respectively above a first threshold value and a second threshold value.

18. The system of claim 16, wherein the at least one of the hardware engine and the client device is configured to compute an approximate gradient of an intensity level function of the video frame using a Sobel operator as part of the estimation of the at least one edge thereof.

19. The system of claim 15, wherein at least one of:
the edge preserving filter is a bilateral filter having a spatial filter component and a range filter component, and
a component performing the adaptive temporal filtering is a first-order IIR filter, the IIR filter being configured to generate an output by recursively applying alpha-blending of the video frame with a previous temporally filtered video frame of the video sequence.

20. The system of claim 19, wherein the at least one of the hardware engine and the client device is further configured to adapt the bilateral filter through varying at least one of a deviation parameter associated with the spatial filter component and a radiometric deviation parameter associated with the range filter component.

* * * * *